A. S. CHESSIN.
GYROSCOPIC COMPASS.
APPLICATION FILED DEC. 14, 1908.

1,137,258.

Patented Apr. 27, 1915.
4 SHEETS—SHEET 1.

WITNESSES
G. V. Rasmussen
John Lotka

INVENTOR
ALEXANDER S. CHESSIN
BY
Briesen & Knauth
ATTORNEYS

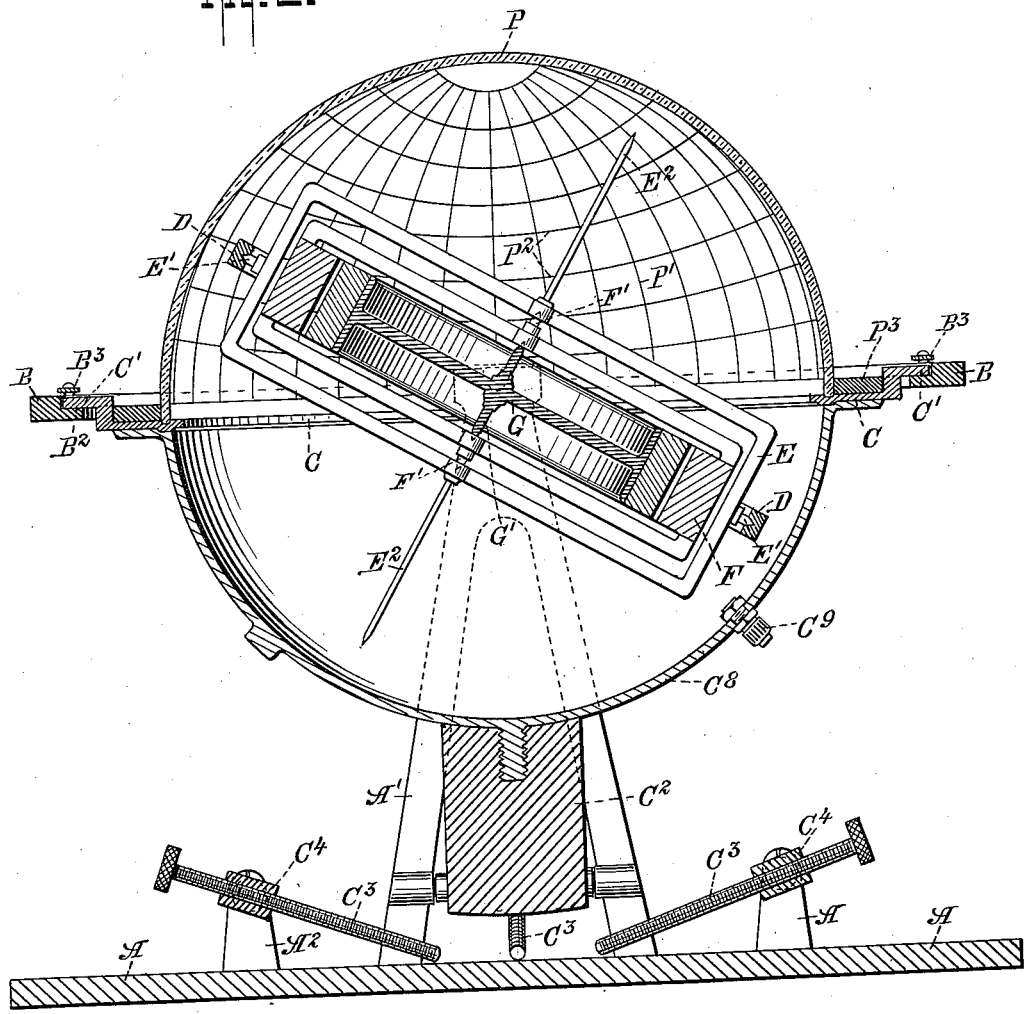

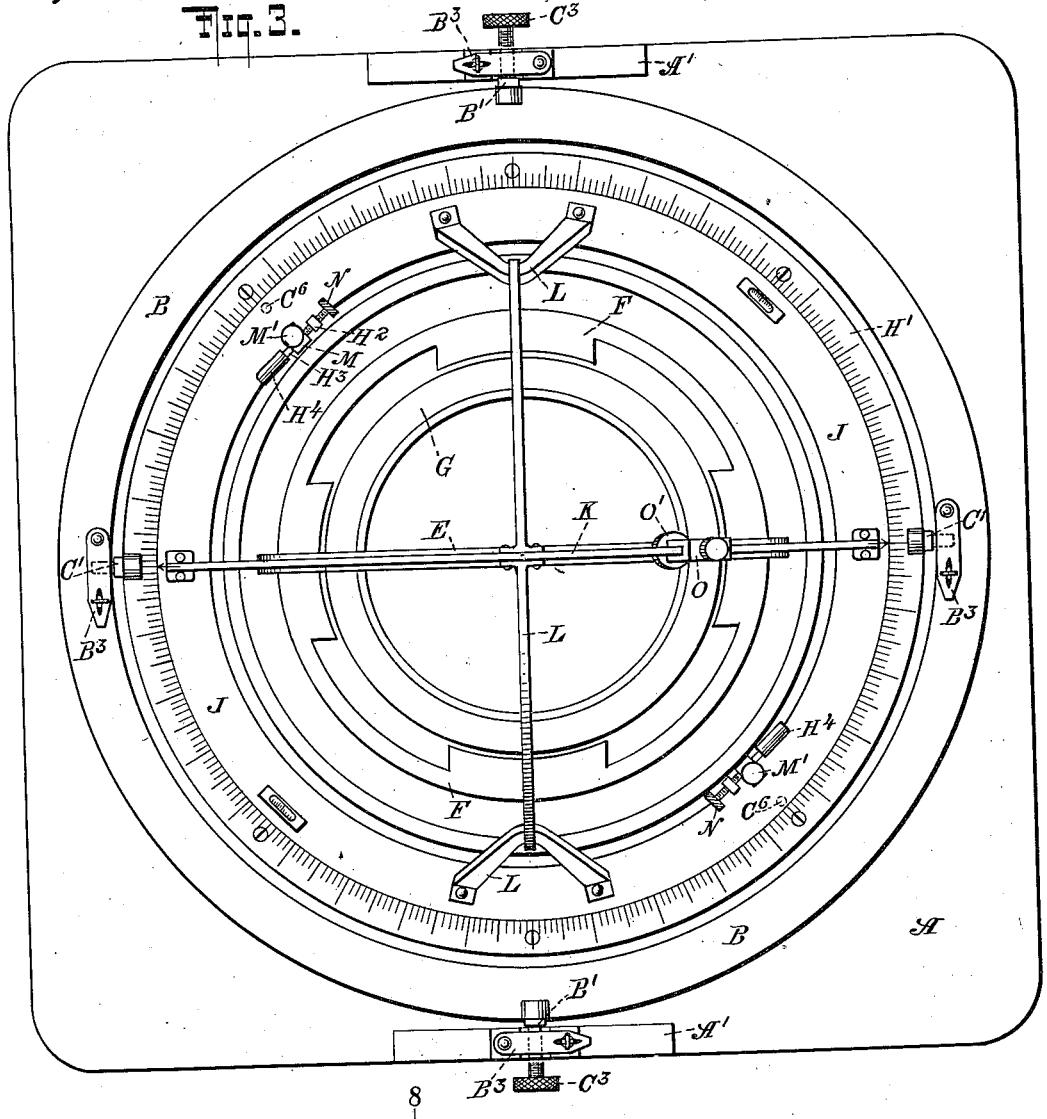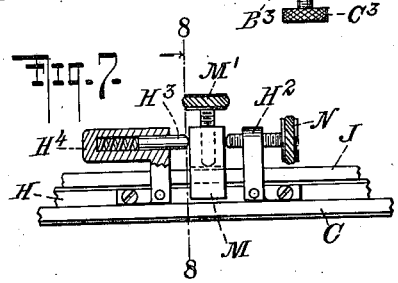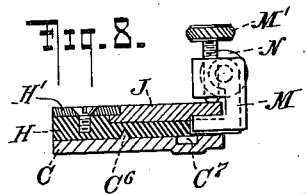

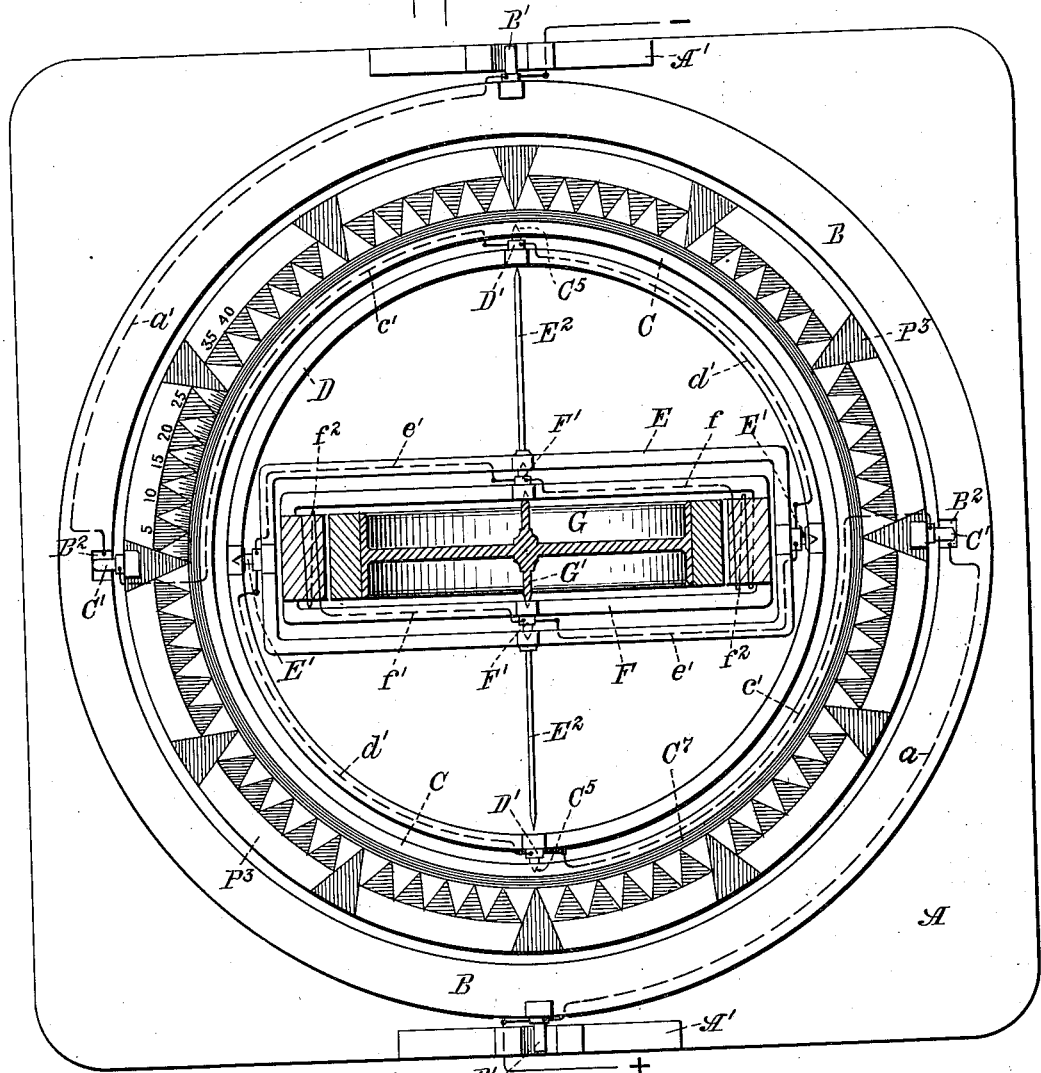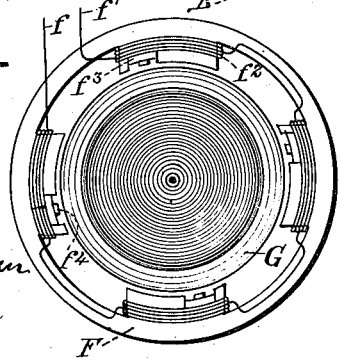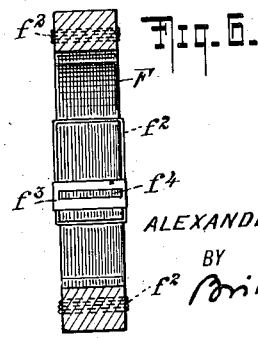

UNITED STATES PATENT OFFICE.

ALEXANDER S. CHESSIN, OF NEW YORK, N. Y.

GYROSCOPIC COMPASS.

1,137,258.

Specification of Letters Patent. Patented Apr. 27, 1915.

Application filed December 14, 1908. Serial No. 467,361.

*To all whom it may concern:*

Be it known that I, ALEXANDER S. CHESSIN, a subject of the Emperor of Russia, and resident of the borough of Manhattan, city, county, and State of New York, have invented certain new and useful Improvements in Gyroscopic Compasses, of which the following is a specification.

My invention relates to gyroscopes and has for its object to provide a simple and efficient construction for indicating the true north-south direction with the aid of gyroscopic action, so that the apparatus may be employed as a reliable and advantageous substitute for the common magnetic ship's compass.

One of the distinctive and important features of my gyroscopic compass is that it entirely eliminates all precessional motion of the apparatus. Any construction involving precessional motion, either designedly, or accidentally, is impractical because it is liable to add or detract from the gyroscopic effect of the earth's rotation, to confuse observation of results, to require constant delicate readjustment and to conceal instrumental and other errors.

Another distinctive and important feature of my apparatus is that it affords means for starting the axis of the spinning body in a position of perfect rest relatively to the earth. Failure to do this will introduce errors that cannot be estimated, even a slight deviation or impulse given to the axis of the spinning body at the start resulting in precession and nutation.

A third important and distinctive feature of my invention is that it affords means for detaching the working apparatus from the ship's support and to carry it to and from the shore where all adjustments can be made with great precision. Other objects and useful features of my invention will appear from the description following hereinafter.

A gyroscopic compass embodying my invention is illustrated in the accompanying drawings, in which—

Figure 1:
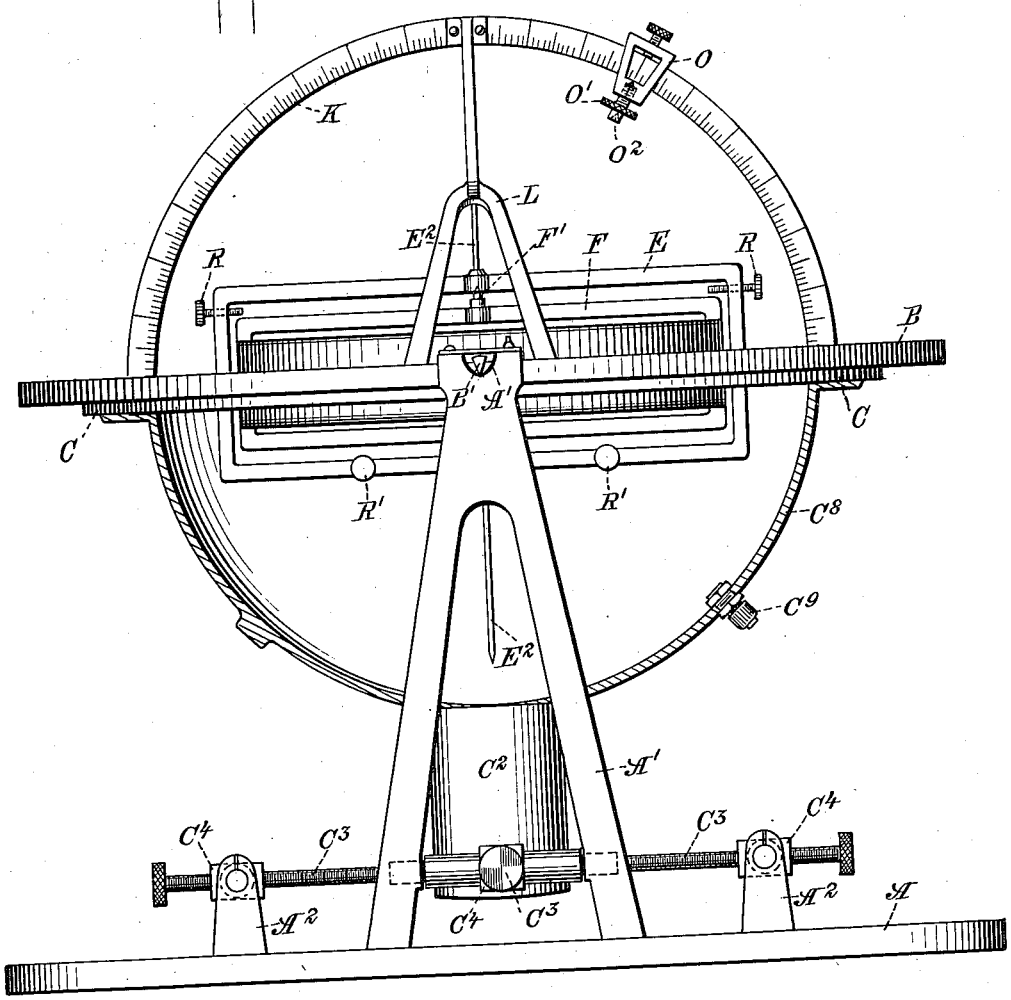
Figure 9:
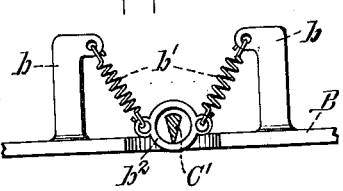

Figure 1 is a front elevation of the apparatus in position for setting it, with parts in section; Fig. 2 is a vertical section of the apparatus in operation; Fig. 3 is a plan view corresponding to Fig. 1, Fig. 4 is a plan view of the apparatus in a different operative position, with parts in section; Fig. 5 is a diagrammatic view illustrating the electric motor; Fig. 6 is a cross section thereof; Fig. 7 is a face view of a micrometer adjustment looking from the inside; Fig. 8 is a cross section on line 8—8 of Fig. 7; and Fig. 9 is a detail of an elastic suspension.

The instrument comprises a suitable base A firmly secured to the ship and provided with bearings A′ for the alined trunnions B′ of a ring B. These trunnions are horizontal when the ship is at rest. The ring B is provided with bearings $B^2$, placed in a line at a right angle with that of the trunnions B′, and adapted to receive horizontal trunnions C′ projected outwardly from an inner ring C; preferably the four trunnions are located in the same plane.

The detail construction of bearings and trunnions may be of any approved character. In the main figures of the drawings the trunnions are shown as made with knife-edges resting in curved seats of the bearings. In Fig. 9 the trunnions C′ are freely suspended by means of springs b′ the outer ends of which are secured to brackets b carried by the ring B while their inner ends are connected with a sleeve $b^2$ through which the trunnion passes. This construction allows the ring C not only to rock upon its trunnions, but also to move lengthwise and transversely thereof, within the limits governed by the elasticity of the springs. A resilient suspension (which may be applied to either the ring C or the ring B or both) is of especial advantage in the case of ships exposed to big jars, such as caused by the firing of heavy guns.

The inner ring C, which forms a support for the working parts of the apparatus, is kept in a horizontal position by the universal joint construction described above, a weight $C^2$ being connected with said ring for this purpose. In certain cases, as hereinafter referred to, it may be desirable to temporarily lock the apparatus against movement, and this may be effected, for instance, by means of four screws $C^3$ arranged to be projected into engagement with the weight $C^2$. Each screw $C^3$ works in a nut $C^4$ pivoted in brackets $A^2$ projected from the base A. This construction allows the screws to be thrown down, out of the way of the weight, when not in use, as indicated in Fig. 2. The device may be leveled and locked by means of these screws.

The ring C is provided with bearings $C^5$ in a line at a right angle with the trunnions $C'$, to receive trunnion pins $D'$ projected from a ring D. In a line at a right angle to the trunnions $D'$, the ring D has bearings for trunnions $E'$ projected from a frame E which may be of a rectangular shape as shown and is symmetrical with respect to the axis indicated by the trunnions $E'$. This frame carries a gyroscope rotor of any suitable construction, and is provided with pointers $E^2$ indicating the axis of such rotor, which axis is at a right angle to that of the trunnions $E'$. The drawings show a gyroscope consisting of a single-phase induction electric motor (with shading coils) operated by an alternating current. This motor comprises a rotary field member F journaled in the frame E at $F'$, in line with the pointers $E^2$, and an armature member G, mounted to turn about an axis $G'$ likewise alining with the pointers $E^2$. In the usual operation, the field and armature revolve in opposite directions at the start, but one will almost immediately come to rest, the other continuing its spinning.

The axis $E^2$, $F'$, $G'$ may be adjusted to any desired position by swinging the frame E on the trunnions $E'$ and the ring D on the trunnions $D'$. This enables the apparatus to be set (before starting the gyroscope) so that said axis $E^2$, $F'$, $G'$ will be parallel to the earth's axis, and the rotation of the gyroscope rotor will then maintain the said axis $E^2$, $F'$, $G'$ in the same position irrespective of any change of the ship's course.

In order that current may be properly supplied to the motor whatever position the axis $E^2$, $F'$, $G'$ may occupy, the following arrangement of circuits may be employed: The trunnions $B'$, which are suitably insulated one from the other, are connected with a suitable source of electricity as indicated in Fig. 4 and are connected as by wires $a$, $a'$ with the trunnions $C'$, which are again connected by wires $c'$ with the trunnions $D'$ from which wires $d'$ lead to the trunnions $E'$ connected by wires $e'$ with the trunnions $F'$ of the field member F. From these last named trunnions wires $f$, $f'$ lead to the coils $f^2$ which are constructed as laminated shading coils, that is, they are provided with frames $f^3$ of brass or other non-magnetic material, surrounding a portion $f^4$ of the field magnet poles. I do not claim any novelty for the construction of this electric motor per se.

As a guide for adjusting the apparatus so that the axis $E^2$, $F'$, $G'$ will be parallel to the earth's axis, I provide the following device, which is removable from the apparatus: A ring H is set on top of the ring C, being suitably positioned on the ring C, the latter being preferably locked in a level position as by means of the screws $C^3$. The adjustment is made in port, when the ship is relatively steady. The ring H carries rigidly a graduated limb $H'$ and is set on the ring C in a predetermined position governed by the proper marks or registering devices on both rings, such as points $C^6$ fitting corresponding sockets of the ring H. These devices also prevent accidental displacement of the ring H circumferentially during the adjusting operation of the ring, although in some cases the mere weight of the ring and of the parts it carries may be sufficient to prevent such movement. Upon the ring H is adjustable circumferentially, the alidade ring J, suitably guided for this purpose. The alidade ring carries a meridian arc K, steadied by brackets L. The coarse adjustment of the ring J relatively to the (stationary) ring H is obtained manually, the brackets affording convenient handholds. Then a block or nut M, which previously was stationary, is locked to the ring J by means of the screw $M'$, and a fine adjustment is obtained by turning the screw N which abuts against the block M and turns in a bracket $H^2$ rigid with the ring H, the other side of the block being engaged by a spring-pressed plunger $H^3$ sliding in a bracket $H^4$ (Fig. 7). From data obtained in any manner, the arc K is set in the meridian of the place. A clamp O is adjustable along the arc K, and is provided with a set screw $O'$ adapted to engage the inner edge of the arc. The set screw has a central projection $O^2$ recessed for receiving the end of one of the pointers $E^2$. When the clamp is fully released, the screw clears the path of said pointer. From the latitude data obtained by observation or from tables, the clamp O is shifted to the proper point on the scale of the meridian arc K, and then the gyroscope frame is adjusted to bring one of the pointers $E^2$ in registry with the screw $O'$. The latter is then turned so as to lock the clamp O and at the same time bring the socket $O^2$ over the pointer $E^2$, thus holding the gyroscope axis parallel with the earth's axis. The clamp may also be used as a means for bringing the gyroscope axis to the desired position. For this purpose, the clamp (while released) is shifted along the arc K until the pointer $E^2$ registers with the socket $O^2$. Then the screw $O'$ is turned slightly so as to bring the socket into engagement with the pointer, but not enough to hold the clamp stationary on the arc K. Thereupon the clamp is shifted along the arc to the desired position, the pointer $E^2$ sharing this movement. The screw $O'$ is then turned farther to lock the clamp as described above. The gyroscope having been started, the screw $O'$ is turned to release the pointer $E^2$, and the entire device connected with the ring H is removed from the apparatus. I now substitute for said device, an indicator consisting of a transparent globe or rather hemisphere P, having meridian lines P' and circles of latitude P²; the latter may be omitted. The edge of this globe is inserted in a groove C⁷ of the ring C, and a compass-card or graduated circle P³ (which may be permanently attached to the globe) is located adjacent to the globe's edge. Each meridian line P' may therefore be identified readily by the corresponding mark of the graduated circle P³, the latter remaining in the same relation to the ring C during the entire voyage of the ship. Of course it is best to place the zero of the compass scale in the longitudinal axis of the ship.

When the ship starts on her voyage (during which the gyroscope rotor is kept revolving), the initial course (or departure) will be indicated on the compass-card P³ by the meridian line P' with which the pointer E² registers. The axis E², F', G' always remains parallel to the earth's axis. Any change in the ship's course will therefore be indicated by the pointer's E² registering with a different meridian line P' from that noted at the start. In other words, the pointer E² in conjunction with the meridian lines P' and compass-card or graduated circle P³ will have the same function as an ordinary magnetic compass. It will, however, be superior in that it keeps its true north-south direction irrespective of magnetic conditions (both of the earth and of the ship or cargo) and is much less affected by the ship's movement. Moreover, my gyroscopic compass indicates the ship's latitude at any moment, by reference to the parallel circles P².

In some cases it may be preferred to adjust and start the gyroscope on shore and then to carry it on board the ship. All that is necessary for this purpose is that the ring C (with all the parts inward thereof) should be readily removable from the ring B, as by swinging aside the straps B³ which normally extend over the trunnions C'. During the comparatively short time required for the transfer of the gyroscope from the shore to the ship, the momentum would suffice to keep the gyroscope in motion.

It will be seen that the electrical connections are broken when the ring C, etc., is removed from the ring B, but as soon as the gyroscope, with its ring C, is set back upon the ring B, the electrical connections at the trunnions C' are restored automatically and the current will flow through the gyrostat motor to keep it spinning.

In the particular construction shown, the globe P together with the hemispherical carrier C⁸ of the weight C² form a chamber which may be made air tight by the employment of suitable joints and from which air can be exhausted by means of a suction connection applied to the nipple C⁹. This will reduce the resistance which the air opposes to the rotation of the gyroscope rotor, which reduction will be particularly important during the time that the apparatus is being carried from the shore to the ship, as during this time the rotor would run simply by its momentum.

In order to properly balance the apparatus, I might employ adjustable weights formed for instance by screws such as indicated at R, R' in Fig. 1 in connection with the frame E. Similar adjustable weights might be applied to any of the other moving parts such as the field member F or the armature G.

The apparatus may, of course, be used for other purposes wherever it is desired to keep a certain line parallel to a given direction.

I claim as my invention:

1. The combination of a support having a universal suspension, a frame, means for effecting a universal connection of said frame with said support, a gyroscope rotor mounted to rotate in said frame, an arc, adjustable circumferentially of the support, to serve as a guide in positioning the rotor, and means, adjustable on said arc, for bringing the rotor's axis to a predetermined position.

2. The combination of a support, means for effecting a universal suspension of said support, a frame, means for effecting a universal connection of said frame with said support, a gyroscope rotor mounted to rotate in said frame, an arc, adjustable circumferentially of the support, to serve as a guide in positioning the rotor, and a clamp on said arc for holding the rotor in its adjusted position.

3. The combination of a support, means for effecting a universal suspension of said support, a frame, means for effecting a universal connection of said frame with said support, a gyroscope rotor mounted to rotate in said frame, an arc adjustable circumferentially of said support, to serve as a guide in positioning the rotor, and means for holding the rotor in its adjusted position.

4. The combination of a support, means for effecting a universal suspension of said support, a frame, means for effecting a universal connection of said frame with said support, a gyroscope rotor mounted to rotate in said frame, an arc, adjustable circumferentially of said support, to serve as a guide in positioning the rotor, and a clamp, adjustable along said arc, for holding the rotor in its adjusted position.

5. The combination of a support, means for effecting a universal suspension of said support, a frame, means for effecting a universal connection of said frame with said support, a gyroscope rotor mounted to rotate in said frame, and a globe connected with said support to move in unison therewith and having a series of meridians for indicating the position of the gyroscope's axis.

6. The combination of a support, means for effecting a universal suspension of said support, a frame, means for effecting a universal connection of said frame with said support, a gyroscope rotor mounted to rotate in said frame, and a transparent globe connected with said support to move in unison therewith and having a series of meridians for indicating the position of the gyroscope's axis, the gyroscope being located within said globe.

7. The combination of a support, means for effecting a universal suspension of said support, a frame, means for effecting a universal connection of said frame with said support, a gyroscope rotor mounted to rotate in said frame, a guide for positioning the rotor, carried by said support and removable therefrom, and a globe arranged to be substituted for said guide, and having a series of meridians for indicating the position of the gyroscope's axis.

8. The combination of a support, means for effecting a universal connection of said support with a fixed base, said means comprising only two pivot joints whose axes are at right angles to each other, a frame, means for effecting a universal connection of said frame with said support, said means comprising only two pivot joints whose axes are at right angles to each other, a gyroscope rotor mounted to rotate in said frame about an axis stationary relatively to said frame, an arc adjustable circumferentially of said support, to serve as a guide in positioning the rotor, and means for holding the rotor in its adjusted position.

9. The combination of a graduated circle, a concentric ring mounted to slide circumferentially of said circle, a graduated arc carried by said ring and perpendicular to its plane, a frame, means for effecting a universal connection of said frame with said ring, and a gyroscope rotor mounted to rotate in said frame.

10. The combination of a horizontal graduated circle, a vertical graduated arc adjustable circumferentially of said horizontal circle about a vertical axis, a frame, means for effecting a universal connection of said frame with said horizontal circle, said means comprising only two pivot joints whose axes are at right angles to each other, and a gyroscope rotor mounted to rotate in said frame about an axis stationary relatively to said frame.

11. The combination of a support, means for effecting a universal suspension of said support, a frame, means for effecting a universal connection of said frame with said support, a gyroscope rotor mounted to rotate in said frame, a graduated arc adjustable circumferentially of said support to serve as a guide in positioning the gyroscope relatively to the arc, means connected with the support for indicating the position of said arc relatively thereto, and a base from which all of the aforesaid parts are removable together so as to permit of the gyroscope's being adjusted while removed from the base and then again connected with it after adjustment.

12. The combination of a gyroscope rotor, a frame in which it is mounted to rotate about an axis stationary relatively to said frame, a graduated horizontal ring, means for effecting a universal supporting connection between said frame and said ring, said means comprising only two pivot joints whose axes are at right angles to each other, a graduated vertical arc adjustable circumferentially of said graduated horizontal ring, all of the aforesaid parts being connected, and a base on which all of the aforesaid parts are supported and from which they are removable together.

In testimony whereof I have hereunto set my hand and seal in the presence of two subscribing witnesses.

ALEXANDER S. CHESSIN.

Witnesses:
JOHN LOTKA,
JOHN A. KEHLENBECK.